US012759919B2

(12) United States Patent
Sannar et al.

(10) Patent No.: US 12,759,919 B2
(45) Date of Patent: Oct. 13, 2026

(54) SYSTEMS AND METHODS FOR REMOVAL OF METHANE FROM A METHANE CONTAINING DIGESTATE/FLUIDS/SUBSTRATES FROM METHANE PRODUCING SYSTEMS

(71) Applicant: Agro-Synergies LLC, Royal City, WA (US)

(72) Inventors: Julie Sannar, Visalia, CA (US); James White, Sanger, CA (US); Jim Quan, Fresno, CA (US); Ronald Helland, Scottsdale, AZ (US); John Woods, Fresno, CA (US)

(73) Assignee: Agro-Synergies LLC, Royal City, WA (US)

( * ) Notice: Subject to any disclaimer, the term of this patent is extended or adjusted under 35 U.S.C. 154(b) by 393 days.

(21) Appl. No.: 18/468,707

(22) Filed: Sep. 16, 2023

(65) Prior Publication Data

US 2024/0092670 A1 Mar. 21, 2024

Related U.S. Application Data

(60) Provisional application No. 63/376,062, filed on Sep. 16, 2022.

(51) Int. Cl.
*C02F 11/02* (2006.01)
*C02F 3/32* (2023.01)
(Continued)

(52) U.S. Cl.
CPC ................ *C02F 11/02* (2013.01); *C02F 3/34* (2013.01); *C02F 11/122* (2013.01); *C02F 3/322* (2013.01);
(Continued)

(58) Field of Classification Search
CPC .......... C02F 11/02; C02F 3/34; C02F 11/122; C02F 3/322; C02F 11/125; C02F 2101/30;
(Continued)

(56) References Cited

U.S. PATENT DOCUMENTS 6,500,340 B1 12/2002 Burke
2003/0024876 A1 2/2003 Smis et al.
(Continued)

FOREIGN PATENT DOCUMENTS

WO WO-2014085869 A1 * 6/2014 ............ C12M 25/02

OTHER PUBLICATIONS

International Search Report, dated Jan. 8, 2024, for corresponding International Application No. PCT/US2023/032969 (2 pages).
(Continued)

*Primary Examiner* — Fred Prince
(74) *Attorney, Agent, or Firm* — INTELLECTUAL PROPERTY LAW GROUP LLP

(57) ABSTRACT

The present invention generally relates to systems and methods for the separation and removal of methane from an agricultural methane digestate, for example, agricultural waste. The systems and methods include an extraction system that exposes the methane digestate to agricultural commodities and a microbial additives resulting in products that can be recycled.

17 Claims, 3 Drawing Sheets

(51) Int. Cl.

| | |
|---|---|
| ***C02F 3/34*** | (2023.01) |
| ***C02F 11/12*** | (2019.01) |
| ***C02F 11/122*** | (2019.01) |
| *C02F 11/125* | (2019.01) |
| *C02F 101/30* | (2006.01) |
| *C02F 101/32* | (2006.01) |
| *C02F 103/20* | (2006.01) |

(52) U.S. Cl.
CPC ......... *C02F 11/125* (2013.01); *C02F 2101/30* (2013.01); *C02F 2101/32* (2013.01); *C02F 2103/20* (2013.01); *Y02E 50/30* (2013.01)

(58) Field of Classification Search
CPC ... C02F 2101/32; C02F 2103/20; Y02E 50/30
USPC ......................................... 210/601, 602, 620
See application file for complete search history.

(56) References Cited

U.S. PATENT DOCUMENTS

| | | | | |
|---|---|---|---|---|
| 2016/0251587 | A1 | 9/2016 | Kennedy et al. | |
| 2017/0334796 | A1 | 11/2017 | Summers et al. | |
| 2020/0048122 | A1 * | 2/2020 | Gross | A01D 44/00 |
| 2021/0024861 | A1 | 1/2021 | He et al. | |
| 2021/0171986 | A1 | 6/2021 | Parry et al. | |

OTHER PUBLICATIONS

Written Opinion of the International Searching Authority, dated Jan. 8, 2024, for corresponding International Application No. PCT/US2023/032969 (6 pages).

* cited by examiner

SYSTEMS AND METHODS FOR REMOVAL OF METHANE FROM A METHANE CONTAINING DIGESTATE/FLUIDS/SUBSTRATES FROM METHANE PRODUCING SYSTEMS

CROSS-REFERENCE TO RELATED APPLICATION

This application claims the benefit of priority under 35 U.S.C. § 119(e) based on U.S. Provisional Patent Application having Application No. 63/376,062 filed on Sep. 16, 2022, and entitled "Systems and Methods for Removal of Methane From a Methane Containing Digestate/Fluids/Substrates From Methane Producing Systems", which is hereby incorporated herein by reference in its entirety.

FIELD OF THE INVENTION

The present invention relates to systems and methods that can separate and remove methane from a methane digestate, or any fluid containing methane, naturally occurring or manmade. The present invention also relates to recyclable agricultural wastes.

BACKGROUND OF THE INVENTION

Waste management systems are a critical component of dairy farms, hog farms, food processors and other facilities. With the escalating efforts to reduce greenhouse gas emissions, increasing demands to reduce gaseous emissions from agricultural waste products, such as methane emissions from digestates containing methane (i.e. manure) are being sought after that are efficient, safe and low cost.

Standard industry practices for methane digestate management entail injecting or spreading anaerobic methane digestate on to soil in a cropping area without any remediation. Often, these practices include anaerobic digestion, composting, solid storage, manure-drying practices, and solid separation of manure solids prior to entry into a wet anaerobic environment. Typically, manure is treated with water into a manure waste slurry. One approach uses gravity to separate solids from the manure slurry. Generally, manure slurry is pumped into sinks (i.e., pits or lagoons), with the solids accumulating at the bottom of the pit or lagoon and the water liquid waste pumped off from the top into another holding area.

However, there are disadvantages associated with these practices. Cleanout of the sinks can be tedious and costly, and the water liquid waste usually contains significant amount of chemicals and gases from byproducts of the manure and or agricultural waste (nitrogen, methane, sulfur etc.) which can contribute to potential greenhouse gas emissions and are toxic to the environment.

One of the most effective systems and methods to treat waste products are to use separators. Conventionally, separators (slope separators and slack separators) have been used to dewater and remove larger solids from the agricultural waste slurry before loading the agricultural waste slurry into the pits or lagoons. There are a variety of separators that exists with different screen sizes and various pore sizes. Typically, the separators contain fine screens to separate fine particles from the waste digestate, and coarse or medium screens for manure separation. Although separators can reduce the volume of larger solids from agricultural waste such as manure, they can be quite inefficient due to the smaller minute solid particles that can slip through the aforementioned conventional separator screens, resulting in particles that still contain methane. Another disadvantage is that the separator filter screens employed are often plugged, resulting in extra time, labor and expense.

Additionally, the cost and availability of bedding can be a problem on many farms today. The use of bedding made from recycled agricultural waste can reduce and/or eliminate the need to use traditional bedding and reduce long-term bedding storage requirements for bedding (such as straw, sand or wood shavings), thus reducing labor costs. Emerging waste management practices are highly sought after to manage waste products such as manure, in drier aerobic conditions to reduce methane emissions and provide simple cost-effective solutions to produce unlimited volumes of healthy, safe bedding that is soft, fluffy, odorless bedding from undigested fibers in the manure. Additionally, there is a need to provide sufficient high capacity, quality, uniform, comfortable bedding without significant costs and without increasing the manure volume from agricultural wastes.

Thus, although the above-mentioned conventional systems and methods can remove some methane from the digestates, they have not been demonstrated to remove methane from finer digestate particles.

For the foregoing reasons, there exists a need to find a solution for the removal, disposal and/or alternate use for methane digestate present in agricultural wastes. It would be advantageous to find systems and methods to remove methane and convert demethanized digestates and waste products for environmental recycle, disposal or sale that are more efficient, reliable, less expensive, and provide quality more easily scalable usable products.

These features, advantages and other embodiments of the present invention are further made apparent in the remainder of the present description, appended claims and drawings, to those of ordinary skill in the art.

SUMMARY

The present invention is directed to systems and methods to separate and remove methane from a digestate, for example, agricultural waste slurry, rumen or any fluid containing methane, naturally occurring or manmade. According to an embodiment of the present invention, the system comprises a reactor capable of receiving the digestate and at least one separator. Typically, the reactor comprises a sump containing the digestate, a sufficient amount of agricultural commodities and a sufficient amount of a microbial additives. Preferably, the system is capable of removing the methane from the digestate by reacting the agricultural commodities and microbial additives with the digestate, resulting in a demethanized digestate. In an embodiment of the present invention, the separator includes at least one screen capable of separating the demethanized digestate into demethanized digestate solids and demethanized digestate liquids.

In yet a preferred embodiment of the present invention, the microbial additives comprise at least one aerobic microbe source.

Typically, the digestate is an agricultural digestate which contains methane. Preferably, the digestate is, but not limited to an agricultural waste slurry and/or rumen. More preferably, the digestate includes about 3% solids, the solids comprising about 0.6% fat, about 0.7% ash, about 1.1% protein, and about 0.5% mineral nutrients. Typically, the digestate solids cannot be filtered or separated by conventional methods due to their miniscule size. In a preferred embodiment of the present invention, the system captures these digested solids and demethylates the digestate to make them usable/valuable as dry animal feed, dry soil amendment/fertilizer, liquid nutrient/fertilizer etc. Those skilled in the art can appreciate these percentages are approximate values and will vary according to materials introduced into the digestated, feed stocks, etc. Preferably, these numbers are rounded up to the next even number for analysis.

In yet another embodiment of the present invention, the system can further include a screw press for the demethanized solids and the system can further include a filter for the demethanized liquids.

Additionally, in another embodiment of the present invention, the system can further include a collection source to receive the demethanized digestate solids and demethanized digestate liquids.

Preferably, the agricultural commodities includes all feed commodities, agricultural crop wastes, green wastes, food wastes, animal and aquatic wastes, manures, composts, artificial/natural fluids/substrates, and/or combinations thereof.

In yet another typical embodiment of the present invention, the agricultural commodities are capable of being thickening, complexing/chelating, binding agents.

In yet an alternate embodiment of the present invention, the microbial additives include but are not limited to fungi, bacteria, algae or combinations thereof.

In an embodiment of the present invention, the system can comprise a first separator and a second separator. Preferably, the first separator includes screens with hole openings larger than the second separator.

In a most preferred embodiment of the present invention, the first and second separators are sloped screen separators.

In yet another embodiment of the present invention, the system can further include aeration pumps, conveyor belts and pasteurizers.

In a preferred embodiment of the present invention, a method for removing methane from a digestate with the aforementioned system is disclosed. The method comprising the steps of 1) exposing the digestate to a sufficient amount of agricultural commodities and a sufficient amount of microbial additives forming a reaction mixture to produce a demethanized digestate slurry; and 2) separating the demethanized digestate slurry into demethanized digestate liquids and demethanized digestate solids. In an embodiment of the present invention, the microbial additives comprise an aerobic microbe source. In a most preferred embodiment of the present invention, this method is a secondary microbial digestion.

In yet another preferred embodiment of the present invention, a method for removing methane from a digestate is disclosed. The method comprising the steps of 1) exposing the digestate to a sufficient amount of agricultural commodities and a sufficient amount of microbial additives forming a reaction mixture; 2) aerating and circulating the reaction mixture to produce a demethanized digestate slurry; 3) subjecting the demethanized digestate slurry to at least one screen having a plurality of screen openings to separate the demethanized digestate slurry into screened demethanized digestate liquids and screened demethanized digestate solids; 4) filtering the screened demethanized digestate liquids that falls through the screen to form filtered demethanized digestate liquids; 5) transferring the filtered demethanized digestate liquids to storage; and 6) moving the screened demethanized solids through a screw press and then to a stacking area.

Preferably, the agricultural commodities includes all feed commodities, agricultural crop wastes, green wastes, food wastes, animal and aquatic wastes, manures, composts, artificial/natural fluids/substrates, and/or combinations thereof.

In yet another typical embodiment of the present invention, the agricultural commodities are capable of being thickening, complexing/chelating, binding agents.

In yet an alternate embodiment of the present invention, the microbial additives include but are not limited to fungi, bacteria, algae or combinations thereof.

In an embodiment of the present invention, the system can comprise at least one screen.

In a most preferred embodiment of the present invention, the screens are sloped screen separators.

In one embodiment, the microbial additive comprises at least one aerobic microbe source.

In a preferred embodiment, the digestate comprises an agricultural waste slurry.

In yet another preferred embodiment, the digestate is, but not limited to an agricultural waste slurry and/or rumen. Typically, an example of the digestate includes about 3% solids, the solids comprising about 0.6% fat, about 0.7% ash, about 1.1% protein, and about 0.5% mineral nutrients. Where there is greater than 3% solids, one would need to subject the digestate to pre-conditions. Those skilled in the art can appreciate these percentages are approximate values and will vary according to materials introduced into the digestate, feed stocks, etc. Preferably, these numbers are rounded up to the next even number for analysis.

In yet another alternate preferred embodiment of the present invention, additional microbial additives can be added at any step during the aforementioned methods and at the end products.

In an embodiment of the present invention, a method for separating and removing methane from methane digestate such as agricultural waste slurry or rumen is provided.

BRIEF DESCRIPTION OF THE DRAWINGS

In order to describe embodiments of the present invention more fully, reference is made to the accompanying drawings. These drawings are not to be considered limitations in the scope of the invention, but are merely illustrative.

Figure 1:
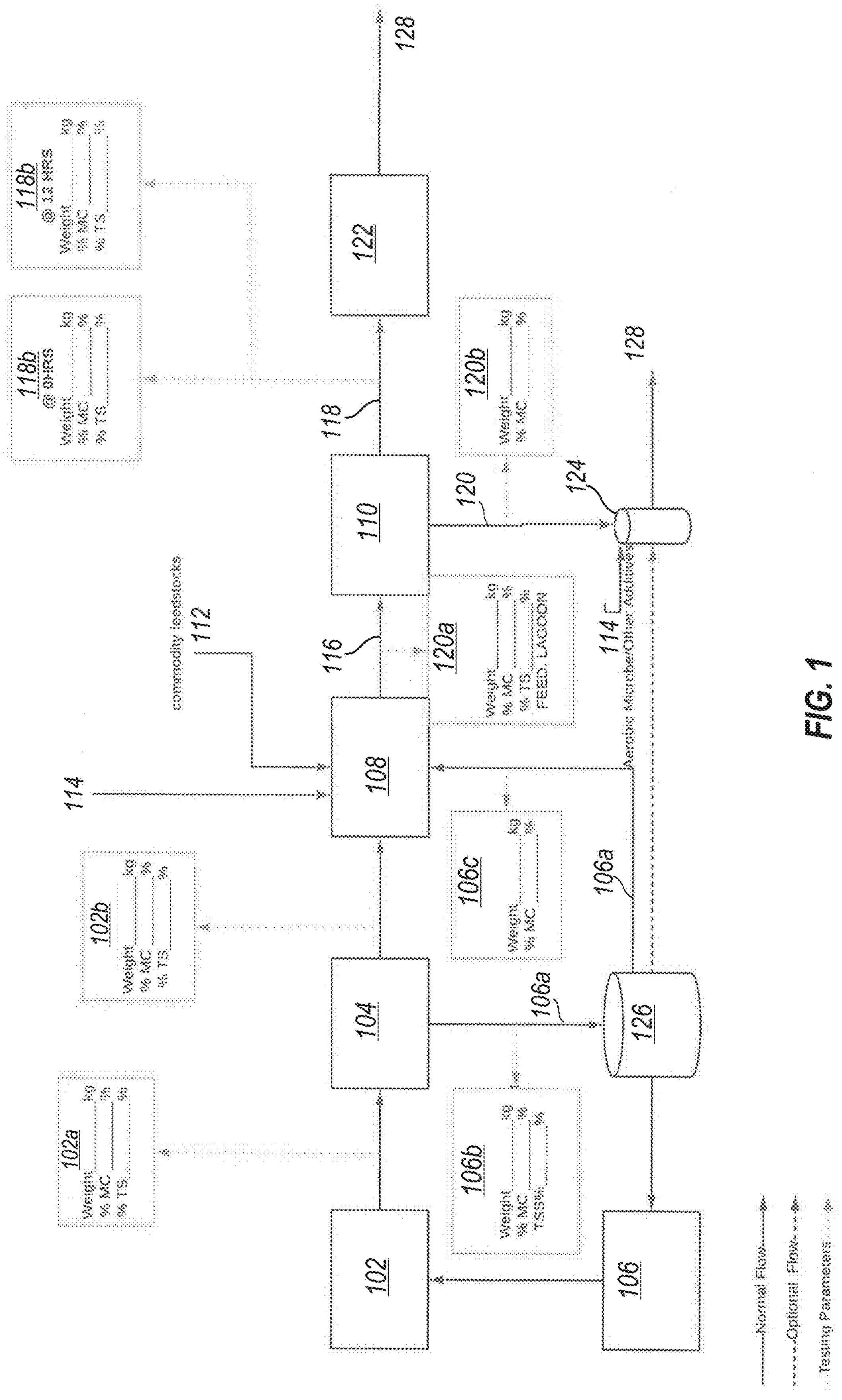
FIG. 1 illustrates a schematic system for separating and removing methane from a digestate; according to an embodiment of the present invention.

These and other features, aspects, and advantages of the present invention will become better understood with reference to the following description.

DETAILED DESCRIPTION OF EMBODIMENTS

The description and the drawings of the present disclosure focus on one or more preferred embodiments of the present invention, and describe exemplary optional features and/or alternative embodiments of the present invention. The description and drawings are for the purpose of illustration and not limitation. Those of ordinary skill in the art would recognize variations, modifications and alternatives which are also within the scope of the invention.

The present invention addresses the aforementioned need for the reduction of methane from an agricultural digestate such as a methane digestate, or any fluid containing methane, naturally occurring or manmade. In a typical embodiment, the present invention generally relates to systems and methods for separating, reduction and removal of methane from a methane digestate, for example, agricultural waste slurry or rumen.

The present systems and methods address the aforementioned problems with agricultural methane digestates containing solids that cannot be filtered or separated by conventional methods due to their miniscule size.

In a most preferred embodiment of the present invention, the systems and methods disclosed, demethylate the agricultural methane digestate and capture the demethanized solids and demethanized liquids to make products for further use and value as dry animal feed; dry soil amendments/fertilizers; liquid nutrients/fertilizers, animal bedding etc.

In a preferred embodiment of the present invention, the systems and methods used to demethanize and separate methane from the methane digestate, or any fluid containing methane, naturally occurring or manmade, include an extraction system that sequesters and collects methane from the methane digestate (i.e. agricultural waste slurry or rumen) through the use of manure screening equipment (i.e. dairy manure screening equipment, slope screen separator), separators, and screening systems and methods used in the demethanization of methane and gas digestates. Within this system and process, microbial species are added to bio-chemically prevent methane production.

In a most preferred embodiment of the present invention, a system and process for separating and removing methane from a digestate is disclosed. Preferably, the system comprises: a reactor capable of receiving the digestate, a) a sufficient amount of agricultural commodities, etc, b) a sufficient amount of microbial additives for demethanization, wherein the microbial additives comprise microbial species added to bio-chemically prevent methane production; and, c) at least one separator (i.e. dairy manure equipment, slope screen separator), wherein the methane is removed from the digestate by reacting the agricultural commodities and microbial additives with the digestate resulting in a demethanized digestate; whereby, the at least one separator includes at least one screen capable of separating the demethanized digestate into demethanized digestate solids and demethanized digestate liquids.

In a most preferred embodiment of the present invention, the purpose of the systems and methods enclosed, is to further reduce methane in digestates such as agricultural methane digestates that contain approximately 3% solids (0.6% fat, 0.7% ash, 1.1% protein and 0.5% mineral nutrients). Those skilled in the art can appreciate these percentages are approximate values and will vary according to materials introduced into the digestate, feed stocks, etc. Preferably, these numbers are rounded up to the next even number for analysis.

According to an embodiment of the present invention, digestates greater than 3% solids typically would be subjected to conventional systems and/or pre-filtering conditions.

In an embodiment of the present invention, the system and methods disclosed address the agricultural methane digestates that have typically been subjected to a digestor and/or pre-filter/screening to separate larger solid particles.

In a preferred embodiment of the present invention, the agricultural methane digestates contain approximately 3% solids (0.6% fat, 0.7% ash, 1.1% protein and 0.5% mineral nutrients), and are piped or pumped from methane reactors to a reactor comprised of a sump or vat, where prepared agricultural commodities (Ag Commodities) are added in specific ratios, with a calibrated rate of microbial additives forming a reaction mixture. In a most preferred embodiment of the present invention, the methane digestate disclosed cannot be filtered or separated with conventional systems and methods due to the methane digestate miniscule particle size. The amounts the agricultural commodities and microbial additives added to the agricultural methane digestate in the reactor (i.e. sump, vat, compartment) will vary depending on what is input into the reactor. A sufficient amount of agricultural commodities and microbial additives are added to react with the agricultural methane digestate resulting in whatever specific final product is desired.

In an embodiment of the present invention, the microbial additives can be included to build up the bigger solid particle size to filter out.

Preferably, the agricultural commodities and the microbial additives are aerated and circulated with the agricultural methane digestate in the reactor for a specific time. Preferably, the length of time varies on the make up of the material added, grind sizes, etc. During this time, a "natural hydrolysis reaction" takes place within the reactor. More preferably, the length of time correlates to the time needed to complete the "natural hydrolysis reaction". In a preferred embodiment of the present invention, the solids in the methane digestate are captured by the agricultural commodities and the microbial additives react with the methane digestate, using the agricultural commodities as a food source. The microbial additives typically can overpower the anaerobic methane producing microbes from the methane digestate, effectively removing methane from the digestate. Within this system and process, the microbial species added bio-chemically prevent methane production.

In a most preferred embodiment, this is a secondary digestion and process in the system and methods of the present invention.

Following the secondary digestion, all the demethanized digestate solids can now be available for separation from the demethanized digestate liquids by at least one separator(s). In a most preferred embodiment of the present invention, the secondary demethanized digestates are pumped to the top of a dairy manure screening separator system. Preferably, the dairy screen separator is a sloped screen separator with different meshes/sizes, where the demethanized digestate liquids and demethanized digestate solids are separated.

According to an embodiment of the present invention, any separator known to those skilled in the art can be used (i.e. slope screen separators) for maximum efficiency. Typically, the separator is used for dewatering solids and recycling water. Additionally, the separator separates larger solids from smaller solids and liquids. Separators are also known to thicken waste products and concentrate solids (reducing storage volume). Solids from separators can be used as fertilizers and for the production of dry bedding. According to a preferred embodiment of the present invention, different size screens in combination with various pore sizes can been used to filter and extract the larger solids from the agricultural waste slurry.

In an embodiment of the present invention dairy manure screening equipment is used. In a most preferred embodiment of the present invention, the separator(s) are sloped screen separators.

In a preferred embodiment of the present invention, the system comprises a first separator and a second separator. Preferably, the first separator includes screens with hole openings larger than the second separator. Typical first separators have screens with hole openings from about 380 microns to about 800 microns; and second separators have screens with hole openings from about 250 microns to about 380 microns respectively.

Next, the demethanized digestate solids can be moved through a screw press. Any screw press known to those skilled in the art can be used to produce uniform, soft, fluffy dry bedding from undigested fibers in the digestate.

In yet another embodiment of the present invention, after being subjected to the screw press, the demethanized digestate solids can be moved on to a conveyor belt to a stacking area for storage or further use. Any conveyor belt known to those skilled in the art can be used, and can include and not be limited to stacking conveyor belts, dewatering conveyor belts and utility conveyor belts.

In a preferred embodiment of the present invention, the remaining demethanized digestate liquids can be filtered through any filter known to those skilled in the art of sufficient size and mesh to further separate the demethanized solids from the demethanized liquids. More preferably a 100-mesh filter can and transferred to storage tanks for storage or further use.

In yet an alternated embodiment of the present invention, more of the microbial additives or additional additives for upgrading can be added as needed to the demethanized liquids or demethanized dry products at the end, or any time during the process of removing methane from the digestate. Within this system and process, the microbial species added bio-chemically prevent methane production.

The system and methods can further include vibrator systems for providing additional dewatering, pressure washers, aeration pumps, conveyor belts and pasteurizers known to those skilled in the art.

Typically, demethanized dry products after being separated comprise about 35%-40% dry matter. Pasteurizers can be used (with heat) to further desiccate, dry and further reduce and/or eliminate pathogens from the demethanized solids to provide high quality sanitary healthy bedding.

In yet an another embodiment of the present invention, one skilled in the art can appreciate the systems and methods by the addition of agricultural commodities and microbial additives (facilitating microbial digestion) to react with agricultural methane digestates; and then subjecting to sloped screen separator(s) (resulting in demethanized solids that can be used for recycling/reclaiming purposes including commercial (i.e. dry animal feed, dry soil amendment/fertilizer, etc.); recycled/reclaimed gas bi-products (i.e. methane); and recycled/reclaimed demethanized liquids.

As can be appreciated, an embodiment of the present invention discloses typical applications and benefits to remove methane from an agricultural methane digestate and turn anaerobic liquid waste into a valued dry and/or liquid commodities with multiple uses including recycling back for use. More specifically, the preferred embodiments of the systems and methods disclosed in FIGS. 1-3 can create livestock/dairy feed, healthy compost-like soil amendments, carriers for mineral soil amendments (i.e. gypsum, limestone, sulfur dolomite), and microbial food sources to support soil and plant interactions.

Referring now to FIG. 1 a schematic diagram illustrating a system 100 to separate and remove methane from a digestate is provided according to an embodiment of the present invention. It can be appreciated to those skilled in the art that the system 100 can be applied to any fluid or liquid containing methane, naturally occurring or manmade. Typically, the digestate 102 is an agricultural digestate which contains methane and can be any digestate known to those skilled in the art that is used for agricultural waste management. Many of the digestates include agricultural wastes from, for example, dairy farms. Preferably, the digestate is, but not limited to an agricultural waste slurry and/or rumen. According to an embodiment of the present invention, the system 100 can be designed to handle total suspended solids (TSS) concentration less than about 15%. More preferably, the digestate includes about 3% solids, the solids comprising about 0.6% fat, about 0.7% ash, about 1.1% protein, and about 0.5% mineral nutrients. According to an embodiment of the present invention, digestates greater than 3% solids typically would be subjected to conventional systems and/or pre-filtering conditions.

Those skilled in the art can appreciate these percentages are approximate values and will vary according to materials introduced into the digestate, feed stocks, etc. Preferably, these numbers are rounded up to the next even number for analysis.

In yet another typical embodiment of the present invention, the agricultural methane digestate 102 can be subjected to a pre-screen to remove larger agricultural methane digestate solids with total suspended solids (TSS) concentration greater than about 15%. Typically, this pre-screen includes an agricultural dewatering screen 104 with a treated liquid 106 that has undergone a water treatment to remove larger agricultural methane digestate solids. Any typical dewatering screens known to those skilled in the art can be used. The treated liquid 106 can undergo any water treatment known to those skilled in the art, such as for example, BioFiltro or DAF/flocculation, herein incorporated by reference.

In a preferred embodiment, the system 100 is an extraction system and comprises a reactor 108 capable of receiving the digestate 102, and at least one separator 110. More preferably, the reactor 108 comprises a vat or sump or compartment containing a mixture of the remaining methane digestate 102, a sufficient amount of agricultural commodities 112 and a sufficient amount of microbial additives 114. Preferably, the system 100 is capable of removing the methane from the digestate 102 present in the reactor 108 by providing a quantity sufficient of agricultural commodities 112 and a quantity sufficient of microbial additives 114 to react with the agricultural methane digestate 102, sequestering methane gas and resulting in a demethanized digestate 116.

In a preferred embodiment, the mixture is incubated in the reactor 108 for a sufficient amount of time for the agricultural commodities 112 and microbial additives 114 can react with the methane digestate 102 to form the demethanized digestate 116. More preferably, the reactor is a sump enabling greater contact and greater circulation of the digestate 102 to the agricultural commodities 112 and the aerobic microbe source 114, resulting in increasing the rate of hydrolysis and resulting in maximized demethanized digestate 116.

In a preferred embodiment of the present invention, the remaining methane digestate 102 that cannot be filtered or separated due to their miniscule size typically is pumped from methane reactors into the reactor 108.

FIG. 1 illustrates the simplest possible reactor 108, although those in the art can appreciate that other embodiments of the present invention can use reactors with higher surface area. Typically, the reactor 108 can be any reactor chamber which is a tank known to those skilled in the art and FIG. 1 illustrates the simplest possible reactor, although those in the art can appreciate that other embodiments of the present invention can use reactor chambers with multiple channels with higher surface area. Preferably, the higher the surface area, the greater the amount of methane can be removed.

According to an embodiment of the present invention, typically, the reactor 108 can be a batch or continuous flow reactor known to those skilled in the art.

In yet another embodiment of the present invention, typically the temperature and pressure can be calibrated sufficient for the agricultural commodities 112 and microbial additives 114 to react with the methane digestate 102 to form the demethanized digestate 116.

In a preferred embodiment of the present invention, the agricultural methane digestates 102 contain approximately 3% solids (0.6% fat, 0.7% ash, 1.1% protein and 0.5% mineral nutrients), and are piped or pumped from methane reactors to reactor 108 comprised of a sump or vat or compartment where prepared agricultural commodities 112 are added in specific ratios, with a calibrated rate of microbial additives 114 forming a reaction mixture. In a most preferred embodiment of the present invention, the methane digestate 102 disclosed cannot be filtered or separated with conventional systems and methods due to the methane digestate miniscule particle size. The amounts the agricultural commodities 112 and microbial additives 114 added to the agricultural methane digestates 102 in the reactor 108 (i.e. sump, vat, compartment) will vary depending on what is input into the reactor. A sufficient amount of agricultural commodities 112 and microbial additives 114 are added to react with the agricultural methane digestate 102 resulting in whatever specific final product is desired.

In an embodiment of the present invention, the microbial additives 114 can be included to build up the bigger solid particle size to filter out.

Preferably, the agricultural commodities 112 and the microbial additives 114 are aerated and circulated with the agricultural methane digestate in the reactor for a specific time. Preferably, the length of time varies on the make up of the material added, grind sizes, etc. During this time, a "natural hydrolysis reaction" takes place within the reactor. More preferably, the length of time correlates to the time needed to complete the "natural hydrolysis reaction". In a preferred embodiment of the present invention, the solids in the agricultural methane digestates 102 are captured by the agricultural commodities 112 and the microbial additives 114 react with the methane digestate 102, using the agricultural commodities 112 as a food source. The microbial additives 114 typically can overpower the anaerobic methane producing microbes from the methane digestate, effectively removing methane from the digestate.

In a yet another embodiment of the present invention, the time in the reactor 108 varies with the type and amount of agricultural digestate. Preferably, the time is sufficient and calculated to maximize the removal of methane from the methane digestate 102 upon exposure to the agricultural commodities 112 and the microbial source 114 resulting in demethanized digestate 116.

In an embodiment of the present invention, preferably, use of agricultural commodities 112 include but are not limited to agricultural crop wastes, green wastes, food wastes, animal and aquatic wastes, manures, composts, commodity feedstocks, artificial/natural fluids/substrates (including rumen) and/or combinations thereof. These agricultural commodities 112 can be used as thickening, complexing/chelating, binding agents in the systems and methods of recycling/reclaiming and demethylation of methane digestate and other gas waste and bi-products to complex sugar, fatty acids, amino acids/proteins, minerals, nutrients, cellulose, organic matter and act as a microbial food source.

In a preferred embodiment of the present invention, the agricultural commodities 112 is ground up before added to the reactor.

In a most preferred alternative embodiment of the present invention, the use of multiple microbial species as microbial additives 114 include but are not limited to fungi, bacteria, algae and/or combinations thereof. The microbial additives 114 are used to overpower the anaerobic methane producing microbes from the digestate, effectively demethylating the digestate to form the demethanized digestate 116.

In yet another embodiment of the present invention, the microbial additives 114 are comprised of at least one aerobic microbe source. Typically, any aerobic microbe sources are used to overpower the anaerobic methane producing microbes from the digestate, effectively demethylating the digestate to form the demethanized digestate 116.

In a most preferred embodiment, this is a secondary digestion in the system and of the present invention. Following the secondary digestion, all the demethanized digestate solids 118 can now be available for separation from the demethanized digestate liquids 120 by at least one separator(s) 110.

In an embodiment of the present invention, the system 100 includes the at least one separator 110. Preferably, the separator 110 can be any separator for waste management known to those skilled in the art that can separate solids from liquid at high throughput rates. Any separator known to those skilled in the art can be used that contributes to dewatering the digestate into solids and liquids for recycling the, for example, manure solids into compost, fertilizer, bedding material, etc., and recycling the liquid.

In accordance to a most preferred embodiment of the present invention, the separator 110 is a slope screen separator for maximum efficiency. Typically, the separator 110 is used for dewatering solids and recycling water. Additionally, the separator 110 separates larger solids from smaller solids and liquids. Separators are also known to thicken waste products and concentrate solids (reducing storage volume). Solids from separators can be used as fertilizers and for the production of dry bedding. According to a preferred embodiment of the present invention, different size screens in combination with various pore sizes can been used to filter and extract the larger solids from the agricultural waste slurry.

In an embodiment of the present invention, the system 100 can comprise a first separator 110 and a second separator 110. Preferably, the first separator includes screens with hole openings larger than the second separator. Typical first separators have screens with hole openings from about 380 microns to about 800 microns; and second separators have screens with hole openings from about 250 microns to about 380 microns respectively.

In a most preferred embodiment of the present invention, the first and second separators 110 are sloped screen separators of various mesh sizes.

Typically, sloped screen separators 110 are most effective when solid content is between about 2% to about 4%. More preferably, the separator 110 includes at least one screen capable of separating the demethanized digestate 116 into demethanized digestate solids 118 and demethanized digestate liquids 120 with maximum efficiency.

In yet an alternative embodiment of the present invention, the system 100 can still further include additional equipment for further separating the demethanized digestate 116 into demethanized digestate solids 118 and demethanized liquids 120. Typically, the system can include a screw press for the demethanized solids 118 and include a filter for the demethanized liquids 120.

Preferably, the screw press can be any screw press known to those skilled in the art used for waste management which can further separate the demethanized digestate 116.

Additionally, in yet another embodiment of the present invention, the system 100 can further include a collection source to receive and store the demethanized digestate solids 122 and a collection source to receive and store demethanized digestate liquids 124 as recycled end products for further customer use 128. Typically, the collection sources 122, 124 can store these recycled end products for up to seven days.

According to yet another preferred optional embodiment of the present invention, the microbial additives 114 along with other additives to demethylate, preserve and store, can be added to the collection sources 122 and 124 if desired.

In a preferred embodiment of the present invention, the remaining liquid 106*a* used after subjecting the agricultural methane digestate 102 to the agricultural dewatering screen 104 can be siphoned off and stored in liquid buffer tanks 126 to be recycled and used in the reactor 108 and/or subjected to water treatment as disclosed above.

In yet another embodiment of the present invention, additionally, pumps can be utilized.

In yet another alternative embodiment of the present invention, referring again to FIG. 1, the system 100 can further include an optional flow (represented by - - - →). Those with ordinary skill in the art can appreciate that the liquids separated from each step can be reused, for example, the liquid from liquid buffer tanks 126 can be used in the demethanized digestate liquids 124 and stored in the liquid processing tanks for further customer use 128.

Still in yet another alternative embodiment of the present invention, referring again to FIG. 1, the system 100 to separate and remove methane from a digestate can further include removing pre-screened agricultural digestate 102*a* and screened solid agricultural digestate 102*b*, resulting from each separation step of solids and liquids before entering into reactor 108; and, demethanized solids 118*b* after being subjected to reactor 108 with agricultural commodities 112 and microbial additives 114. Similarly, in yet another alternative embodiment of the present invention, the system 100 to separate and remove methane from a digestate can further include the remaining liquid 106*a* used after subjecting the agricultural methane digestate 102 to the agricultural dewatering screen 104 can be siphoned off and subjected to water treatment input 106*b*, resulting from separation step of solids and liquids before entering into reactor 108, or liquid from liquid buffer tanks 126 to be recycled and used as coproduct sump liquid input 106*c*. Still further, demethanized digestate liquids 120 after being subjected to agricultural commodities 112 and microbial additives 114 in reactor 108 and separated from demethanized solids 118*b*, can be siphoned off as demethanized liquid coproduct dewatering input 120*a*; or, after being subjected to separator 110, recycled for further use as demethanized liquid co-product 120*b*.

Figure 2:
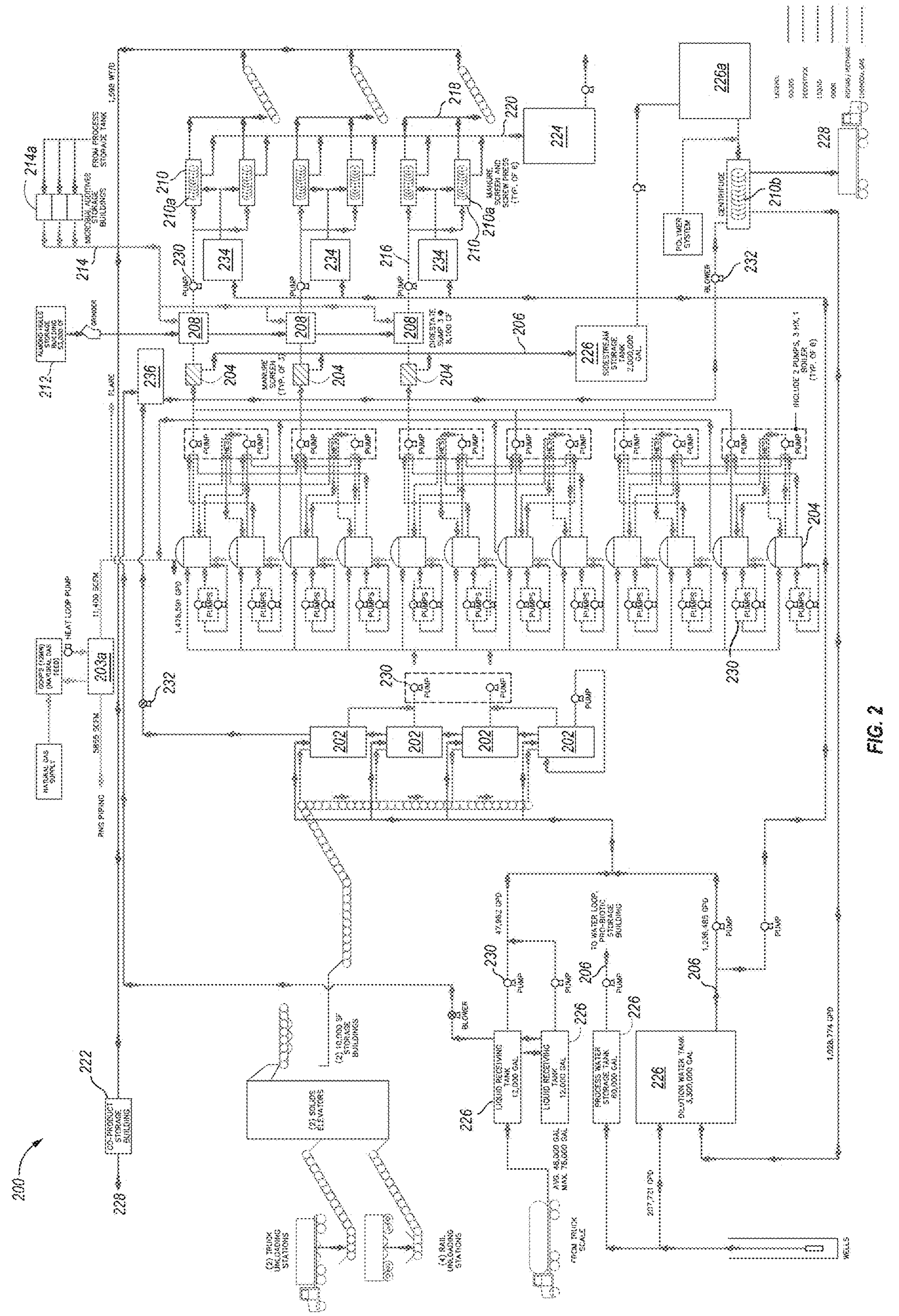
FIG. 2 illustrates an upscaled schematic system for separating, removing, recycling/reclaiming and demethylation of methane from a digestate; according to an embodiment of the present invention.

Referring now to FIG. 2, in yet another preferred embodiment of the present invention, an upscale system 200 for separating and removing methane from digestate is provided that includes the preferred previously embodiments described system FIG. 1. It can be appreciated to those skilled in the art that the system 200 can be applied to any fluid or liquid containing methane, naturally occurring or manmade.

Typically, the digestate 202 is an agricultural digestate which contains methane and can be any digestate known to those skilled in the art that is used for agricultural waste management. Preferably, the digestate is, but not limited to an agricultural waste slurry and/or rumen. More preferably, the agricultural methane 202 digestate includes about 3% solids, the solids comprising about 0.6% fat, about 0.7% ash, about 1.1% protein, and about 0.5% mineral nutrients. When there is greater than 3% solids, one would need to subject the digestate to pre-conditions (for example, filter). Those skilled in the art can appreciate these percentages are approximate values and will vary according to materials introduced into the digestate, feed stocks, etc. Preferably, these numbers are rounded up to the next even number for analysis.

In a typical embodiment of the present invention, the agricultural methane digestate 202 can be contained in a vessel which can be a mixing tank (for example, TYP of 4; 4 @ 1,1000,000 gallons) that include hydraulic with chopper pumps before being moved to a digestor 203. The agricultural digestate can then be subjected to a digester 203 to siphon off biogas and a manure screen 204 to remove larger agricultural methane digestate solids. Typically, any digestor known to those skilled in the art can be used that collects and pumps agricultural methane digestate 202 into a closed system that capable of capturing biogas produced upon breakdown of organic material. The biogas can then be collected and subjected to a gas treatment system 203*a* and converted into, for example, heat and electricity. In a typical embodiment, the digestor 203 can include for example, 12 tanks capable of holding 3,300,000 gallons of agricultural methane digestate 202.

In yet another typical embodiment of the present invention, the agricultural methane digestate 202 can be subjected to a pre-screen to remove larger agricultural methane digestate solids with total suspended solids (TSS) concentration greater than about 15%. Typically, this pre-screen includes an agricultural dewatering screen 204 (for example, a manure screen) with a treated liquid 206 that has undergone a water treatment to remove larger agricultural methane digestate solids. Any typical dewatering screens known to those skilled in the art can be used.

In a preferred embodiment, the system 200 is an extraction system and comprises a reactor 208 capable of receiving the digestate 202, and at least one separator 210. More preferably, the reactor 208 comprises a vat or sump containing the remaining methane digestate 202, a sufficient amount of agricultural commodities 212 and a sufficient amount of microbial additives 214. Preferably, the system 200 is capable of removing the methane from the digestate 202 by reacting the agricultural commodities 212 and microbial additives 214 with the digestate 202, resulting in a demethanized digestate 216.

In a yet another embodiment of the present invention, the time in the reactor 208 varies with the type and amount of agricultural digestate. Preferably, the time is sufficient and calculated to maximize the removal of methane from the methane digestate 202 upon exposure to the agricultural commodities 212 and the microbial source 214 resulting in demethanized digestate 216.

In an embodiment of the present invention, preferably, use of agricultural commodities 212 include agricultural crop wastes, green wastes, food wastes, animal and aquatic wastes, manures, composts, commodity feedstocks, artificial/natural fluids/substrates or combinations thereof. In accordance with an embodiment of the present invention, fluids/substrates includes rumen. These agricultural commodities 212 can be used as thickening, complexing/chelating, binding agents in the systems and methods of recycling/reclaiming and demethylation of methane digestate and other gas waste and bi-products to complex sugar, fatty acids, amino acids/proteins, minerals, nutrients, cellulose, organic matter and act as a microbial food source.

In a preferred embodiment of the present invention, the agricultural commodities 112 is ground up before added to the reactor.

In a most preferred alternative embodiment of the present invention, the use of multiple microbial species as microbial additives 214 include but are not limited to fungi, bacteria, algae and/or combinations thereof, in demethylation and/or reclaiming methane digestate and other bi-products from any microbial digestion system(s) both natural and engineered.

In a typical embodiment of the present invention, the microbial additives 214 comprise an aerobic microbe source. The microbial additives 214 are used to overpower the anaerobic methane producing microbes from the digestate, effectively demethylating the digestate to form the demethanized digestate 216. Within this system and process, the microbial species added bio-chemically prevent methane production.

In yet another typical embodiment of the present invention, the system 200 can further include microbial storage tanks 214*a* for microbial additives 214. Typically, the microbial storage tanks 214*a* are conducive for the microbial additives 214 and can be any storage configured to store microbial additives known to those skilled in the art.

In a preferred embodiment of the present invention, the system 200 includes at least one separator 210 for further separating and dewatering the demethanized digestate 216 into demethanized digestate solids 218 and demethanized liquids 220. Preferably, the separator 210 can be any separator for waste management known to those skilled in the art that can separate solids from liquid at high throughput rates and maximum efficiency. Typically, separators include but are not limited to dairy manure screening equipment, screens, slope screen separators that contribute to the system and process of demethylation of methane and gas digestates.

In a most preferred embodiment of the present invention, the separator(s) 210 is a sloped screen separator (s) to dewater the demethanized digestate 216 into demethanized solids 218 and demethanized liquids 220 for recycling the, for example, manure solids into compost, fertilizer, bedding material, etc., and recycling the liquid, for example to be used in the digestor.

According to an embodiment of the present invention, separators are also known to thicken waste products and concentrate solids (reducing storage volume). Solids from separators can be used as fertilizers and for the production of dry bedding.

According to a preferred embodiment of the present invention, different size screens in combination with various pore sizes can been used to filter and extract the larger solids from the agricultural waste slurry.

In a most preferred embodiment of the present invention, the system can comprise a first separator and a second separator after the reactor 208 for separating and dewatering the demethanized digestate 216 into demethanized solids 218 and demethanized liquids 220. Preferably, the first separator 210 includes screens with hole openings larger than the second separator. Typical first separators have screens with hole openings from about 380 microns to about 800 microns; and second separators have screens with hole openings from about 250 microns to about 380 microns respectively.

Typically, sloped screen separators are most effective when solid content is between about 2% to about 4%. More preferably, the separator 210 includes at least one screen capable of separating the demethanized digestate 216 into demethanized digestate solids 218 and demethanized digestate liquids 220.

In yet an alternative embodiment of the present invention, the system 200 can further include a screw press 210*a* for the demethanized solids 218 and the system can further include a filter for the demethanized liquids 220.

Preferably, the screw press can be any screw press known to those skilled in the art used for waste management.

Additionally, in yet another embodiment of the present invention, the system 200 can further include a solid collection source 222 to receive and store the demethanized digestate solids 218 and a liquid collection source 224 to receive and store demethanized liquids 220 as recycled end products for further customer use 228. Typically, the collection sources 222, 224 can store these recycled end products for up to seven days. In a preferred embodiment of the present invention, the liquid collection source 224 can be a filtrate tank which can hold, for example, 1,000,000 gallons.

According to yet another preferred optional embodiment of the present invention, the microbial additives 214 along with other additives to demethylate, preserve and store, can be added to the collection sources 222 and 224 if desired.

In a preferred embodiment of the present invention, the liquids used after subjecting the agricultural methane digestate 202 to any screens in system 200 can be siphoned off and stored in liquid storage tanks 226 to be recycled and used in the reactor 208 and/or subjected to water treatment 226*a* as disclosed above. Typically, the liquid storage tanks 226 can include any vessel capable of receiving and holding liquid and can include side stream storage tanks which can hold, for example 2,000,000 gallons of liquid, liquid processing tanks, which can hold, for example 60,000 gallons of liquid, liquid receiving tanks which can hold, for example about 12,000 gallons of liquid, and dilution water tanks which can hold, for example, 3,3000,000 gallons of liquid.

In a preferred embodiment of the present invention, the treated liquid 206 that has undergone a water treatment to remove larger agricultural methane digestate solids can be used and recycled at any time in system 200 to add to for example, the microbial additives 214, the agricultural commodities 212, etc.

In still yet another preferred embodiment of the present invention, system 200, can further include pumps 230. Preferably, any pump 230 known to those skilled in the art capable of moving the agricultural methane digestate 202 to the digestor 203 and on to reactor 208. Additionally, pumps 230 can be used to move demethanized digestate solids 218 and demethanized liquids 220 as for storage in collection sources 222, 224 or recycled end products for further customer use 228. For example, the pumps 230 used in FIG. 2 can include 2 pumps, 3 HX, 1 boiler.

In still yet another preferred embodiment of the present invention, system 200, can further include separators such as centrifuges 210*b* capable of further separating the solids. Preferably, any centrifuge 210*b* known to those skilled in the art can be used.

Still further, in yet another embodiment of the present invention, the system 200 can further include blowers 232 to dry and return demethanized digestate solids 218 after separation for recycling or re-filtering for further use.

In yet still another embodiment of the present invention the system 200 can further include any pressure washer 234 known to those skilled in the art, to further rinse the demethanized digestate 216.

In yet still a further embodiment of the present invention, the system 200 can further include any biofilter 236 known to those skilled in the art for reducing odor and other gaseous emissions.

In yet another preferred embodiment of the present invention, methods for separating and removing methane from a digestate are provided. Preferably the method uses the aforementioned extraction systems described and shown in FIGS. 1-2. In a preferred embodiment of the present invention, the digestate is an agricultural digestate that contains methane. More preferably, the digestate is, but not limited to an agricultural waste slurry and/or rumen. First, the agricultural digestate from the system described in FIG. 1 is pumped from methane reactors into a system comprising a reactor. Next, the digestate in the reactor is exposed to a sufficient amount of agricultural commodities and a sufficient amount of microbial additives forming a reaction mixture to produce a demethanized digestate slurry. Then, separating the demethanized digestate slurry into demethanized digestate liquids and demethanized digestate solids. In a preferred embodiment of the present invention, the microbial additives comprise at least one aerobic microbe source.

Figure 3:
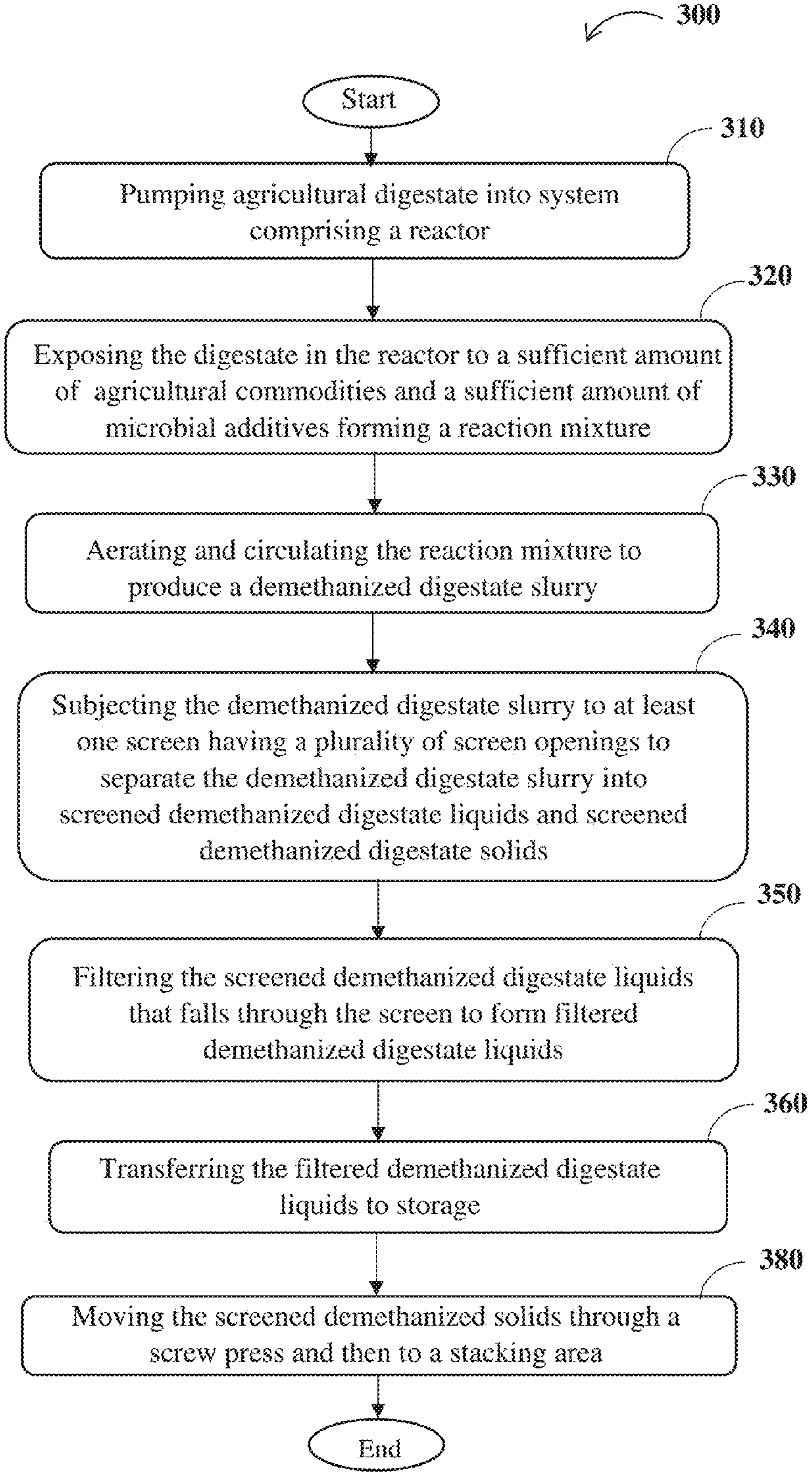
FIG. 3 illustrates a method for separating and removing methane from a digestate, according to an embodiment of the present invention.

In yet another preferred embodiment of the present invention, referring now to FIG. 3, a method 300 for separating and removing methane from a digestate is disclosed. It can be appreciated to those skilled in the art that the method 300 can be applied to any fluid or liquid containing methane, naturally occurring or manmade. First, pumping agricultural methane digestate into a system comprising a reactor 310. Next, exposing the methane digestate to a sufficient amount of agricultural commodities and a sufficient amount of microbial additives forming a reaction mixture 320. Then, aerating and circulating the reaction mixture to produce a demethanized digestate slurry 330. Next, subjecting the demethanized digestate slurry to at least one screen having a plurality of screen openings to separate the demethanized digestate slurry into screened demethanized digestate liquids and screened demethanized digestate solids 340. Then, filtering the screened demethanized digestate liquids that falls through the screen to form filtered demethanized digestate liquids 350. Then, transferring the filtered demethanized digestate liquids to storage 360 and finally, moving the screened demethanized solids through a screw press and then to a stacking area 380.

Preferably, the microbial additive comprises at least one aerobic microbe source.

In a preferred embodiment, the digestate is, but not limited to an agricultural waste slurry and/or rumen. Typically, the digestate includes about 3% solids, the solids comprising about 0.6% fat, about 0.7% ash, about 1.1% protein, and about 0.5% mineral nutrients. Those skilled in the art can appreciate these percentages are approximate values and will vary according to materials introduced into the digestate, feed stocks, etc. Preferably, these numbers are rounded up to the next even number for analysis.

In a preferred embodiment of the present invention, the methods can further include a step of filtering the agricultural waste slurry with a dewatering screen or manure screen to remove larger solids prior to pumping into the reactor. In still yet another embodiment of the present invention, the aforementioned system and methods can be scaled up and much more elaborate. For example, more of the microbial additives or other additives can be increased and added as needed to the liquids stored or the dry solid products in the storage or stacking area, or at any time to ensure removal of methane from the agricultural digestates.

In summary, according to embodiments of the present invention, systems and methods are provided to handle this type of industrial agricultural waste, by removing methane from a methane digestate, that are quick, efficient, self-supporting, cost-effective and can increase profitability.

The advantages of these preferred embodiments of the systems and methods of the present invention takes advantage of the already existing agricultural commodities from the environment where the methane reactor is to be installed. Additional advantages of the systems and methods disclosed in the preferred embodiments of the present invention over typical separator methods, include recycling and turning anaerobic liquid waste into a valued dry and/or liquid commodities with multiple uses. More specifically, the systems and methods disclosed can create livestock/dairy feed, healthy compost-like soil amendments, carrier for mineral soil amendments (i.e., gypsum, limestone, sulfur, dolomite), and microbial food sources to support soil and plant interactions.

Throughout the description and drawings, example embodiments are given with reference to specific configurations. It can be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A system for separating and removing methane from a digestate, the system comprising:

a reactor capable of receiving the digestate, a sufficient amount of agricultural commodities provided as particulate thickening, complexing/chelating, binding agents, and a sufficient amount of microbial additives; and, at least one separator, wherein the reactor is configured for secondary microbial digestion, and during operation, methane is removed from the digestate by reacting the agricultural commodities and microbial additives with the digestate resulting in a demethanized digestate; the microbial additives comprise at least one source of aerobic microbes configured to bio-chemically prevent methane production in the reactor during the secondary microbial digestion by overpowering anaerobic methane producing microbes in the digestate, and the agricultural commodities provide a platform and/or a food source which the aerobic microbes utilize to biochemically react with the methane in the digestate;

whereby, the at least one separator includes at least one screen capable of separating the demethanized digestate into demethanized digestate solids and demethanized digestate liquids.

2. The system according to claim 1, wherein the at least one separator is a sloped screen separator.

3. The system according to claim 1, wherein the microbial additives include but are not limited to fungi, bacteria, algae or combinations thereof.

4. The system according to claim 1, wherein the digestate comprises an agricultural waste slurry.

5. The system according to claim 1, wherein the reactor is selected from the group consisting of a sump, a vat and a compartment.

6. The system according to claim 1, further including a filter for the demethanized liquids; wherein the filter is downstream from the screen separator and configured to remove residual solids from the demethanized digestate liquids.

7. The system according to claim 1, further including a collection source to receive the demethanized digestate solids and demethanized digestate liquids as demethanized end products for subsequent use, wherein the system is configured such that microbial additives can be maintained in the collection source to bio-chemically prevent methane production during storage.

8. The system according to claim 1, wherein the agricultural commodities include agricultural crop wastes, green wastes, food wastes, animal and aquatic wastes, manures, composts, artificial/natural fluids/substrates, or combinations thereof.

9. The system according to claim 1, further including aeration pumps configured to provide aeration and circulation during the secondary microbial digestion, and conveyor belts, configured downstream of separation.

10. The system of claim 1, wherein the at least one separator comprises a first separator and a second separator; whereby the first separator includes screens with hole openings larger than the second separator.

11. A method of separating and removing methane from a digestate using a system according to claim 1, the method comprising the steps of:

exposing the digestate to a sufficient amount of agricultural commodities and a sufficient amount of microbial additives forming a reaction mixture;

incubating the reaction mixture in the reactor as secondary microbial digestion with aeration and circulation for a time sufficient for the aerobic microbes to bio-chemically prevent methane production and to produce a demethanized digestate slurry; and, separating the demethanized digestate slurry into demethanized digestate liquids and demethanized digestate solids using the at least one screen separator.

12. The method according to claim 11, wherein additional microbial additives can be added at any step.

13. A method for removing methane from a digestate, the method comprising the steps of:

exposing the digestate to a sufficient amount of agricultural commodities provided as particulate thickening, complexing/chelating, binding agents, and a sufficient amount of microbial additives forming a reaction mixture, wherein the microbial additives comprise aerobic microbes added to bio-chemically prevent methane production during secondary microbial digestion;

wherein the agricultural commodities provide a platform and/or a food source which microbes utilize to bio-chemically react with the methane in the digestate;

aerating and circulating the reaction mixture to produce a demethanized digestate slurry;

subjecting the demethanized digestate slurry to at least one screen having a plurality of screen openings to separate the demethanized digestate slurry into screened demethanized digestate liquids and screened demethanized digestate solids;

filtering the screened demethanized digestate liquids that fall through the at least one screen to form filtered demethanized digestate liquids;

transferring the filtered demethanized digestate liquids to storage; and, moving the screened demethanized digestate solids to a stacking area, wherein demethanized digestate storage is maintained in a manner that reduces methane re-generation by maintaining microbial suppression and/or by controlling oxygen and microbial activity in the stored liquids and/or solids.

14. The method according to claim 13, wherein the at least one screen is a sloped screen separator.

15. The method according to claim 13, wherein the microbial additives include but are not limited to fungi, bacteria, algae or combinations thereof.

16. The method according to claim 13, wherein the digestate comprises an agricultural waste slurry.

17. The method according to claim 13, wherein additional microbial additives are added during or after any step.

* * * * *